March 28, 1967 W. E. RISE 3,311,198
DISC BRAKE
Filed Sept. 28, 1965 2 Sheets-Sheet 1
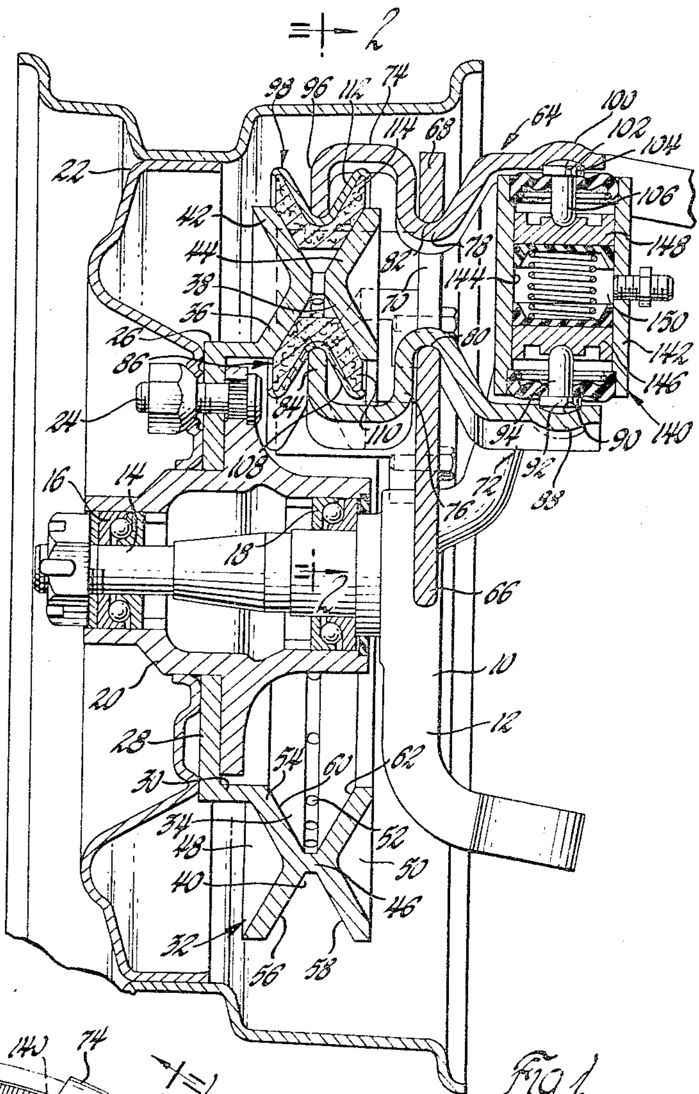
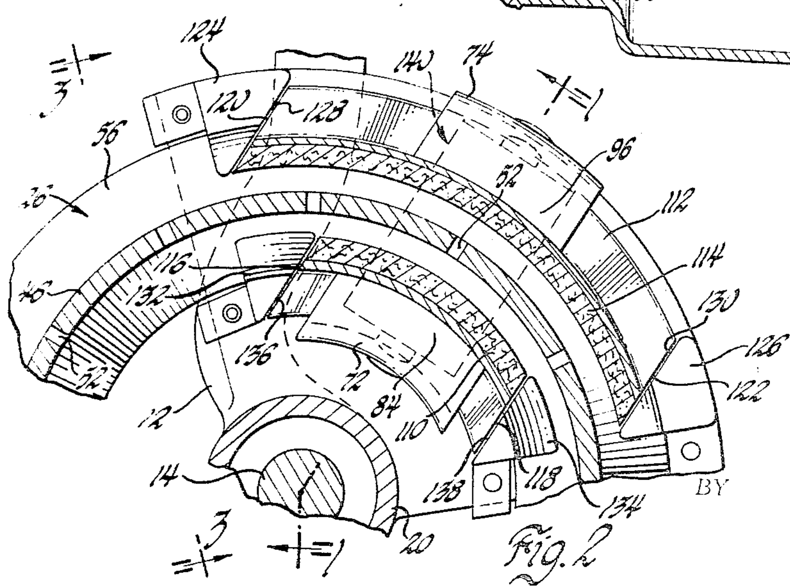
INVENTOR.
William E. Rise
BY
D. D. McGraw
ATTORNEY March 28, 1967 W. E. RISE 3,311,198
DISC BRAKE
Filed Sept. 28, 1965 2 Sheets-Sheet 2
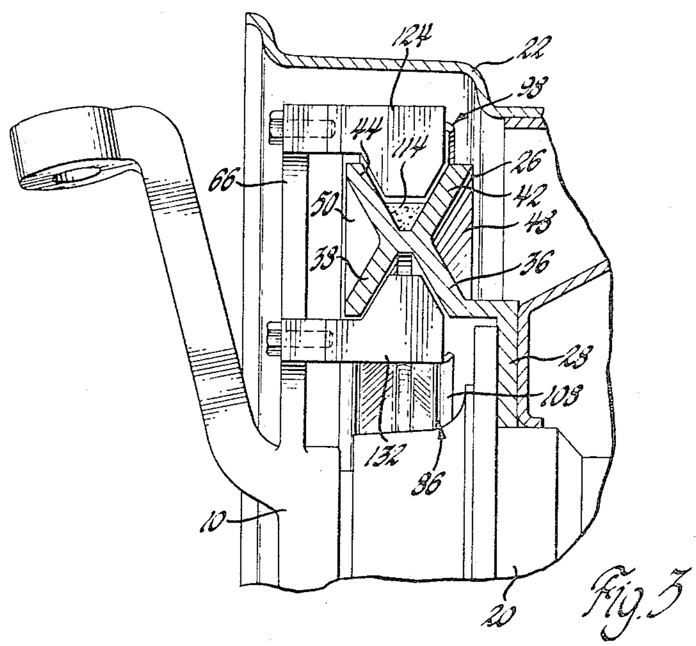
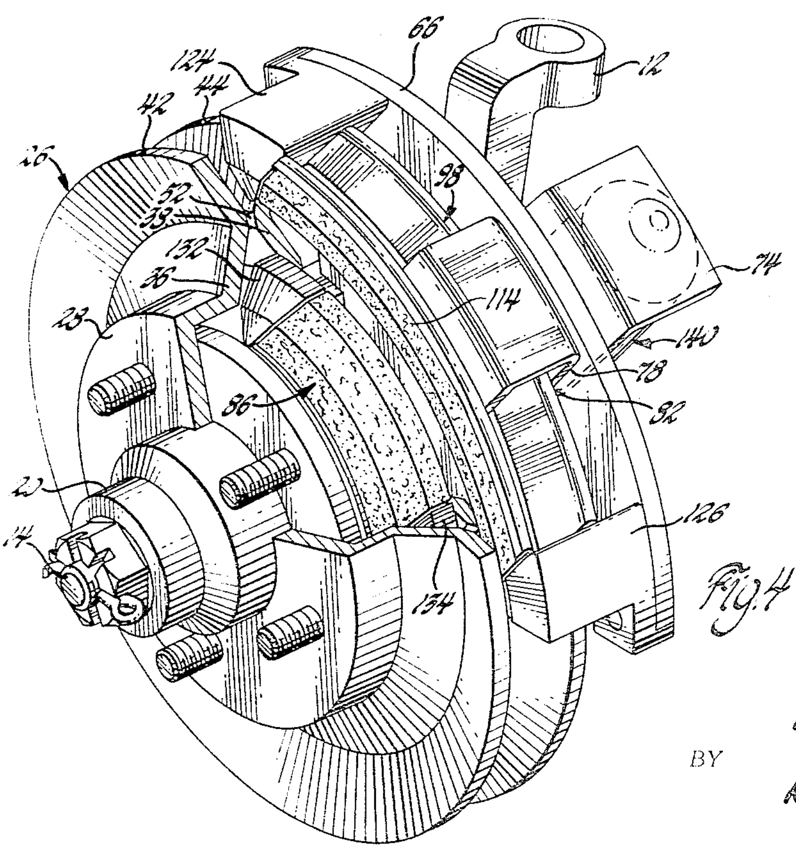
INVENTOR.
William E. Rise
BY D. D. McGraw
ATTORNEY United States Patent Office 3,311,198

Patented Mar. 28, 1967

3,311,198

DISC BRAKE

William E. Rise, Grosse Point, Mich., assignor to General Motors Corporation, Detroit, Mich., a corporation of Delaware Filed Sept. 28, 1965, Ser. No. 490,836

8 Claims. (Cl. 188—75)

This invention relates to a disc brake and more particularly to one utilizing an X-configuration forming opposed divergent disc friction surfaces which are engaged by mating brake blocks. In its preferred embodiment the disc is formed with V-grooves on the radally inner and outer sides of the disc, and the brake linings are shaped to conform to and fit within the V-grooves. The linings are mounted on pivoting brake apply levers which are applied by suitable apply means such as a hydraulic wheel cylinder through a scissors-like action. Utilization of the V-groove arrangement gives a force component multiplication on the sides of the brake linings which allows the use of a smaller wheel cylinder than would be usable if the linings and friction surfaces were arranged to act in the usual manner on opposed parallel plane surfaces. The necessary braking torque, therefore, may be obtained by using wheel cylinders of approximately the same size as that commonly used on duo-servo type drum brakes of similar capacity. This arrangement has the additional advantage of requiring a smaller brake fluid volume which results in a reduction in the displacement requirements of brake fluid and thereby reduces brake pedal travel in order to obtain sufficient master cylinder fluid displacement. This also reduces the compression action of the brake fluid, resulting in reduced brake pedal springiness. The system permits the utilization of standard sintered metal pistons of a type that are currently used in production vehicle brakes, therefore, achieving additional cost savings. It also results in less total weight on the steering knuckles of the front wheels of a vehicle when the brakes are utilized in a vehicle, contributing to better vehicle handling characteristics. It advantageously permits the use of steel stampings forming various portions of the brake caliper assembly. Since a brake of this type is not self-energizing due to the rotation of the disc, the braking torgue is directionally proportional to brake pedal pressure. This type of disc also provides a greater surface area for cooling than the presently used radially extending flat disc with or without internal cooling slots. A disc of this type can also be easily added to an existing vehicle wheel and hub. Structure embodying the invention also permits removal of the brake shoes for replacement without requiring the entire caliper assembly to be removed. Brakes embodying the invention may also be used for braking applications other than vehicles.

In the drawings:

FIGURE 1 is a cross section view of a brake assembly embodying the invention, installed as a part of a vehicle steerable wheel and brake assembly.

FIGURE 2 is a partial section view taken in the direction of arrows 2—2 of FIGURE 1 with parts broken away and in section.

FIGURE 3 is a partial section view taken in the direction of arrows 3—3 of FIGURE 2 with parts broken away and in section.

FIGURE 4 is a perspective view of the brake assembly of FIGURE 1, with parts broken away and in section.

The wheel and brake assembly shown in the drawings and embodying the invention includes a wheel and brake support member 10 which is formed of the steering knuckle 12 and the stub axle 14. Bearings 16 and 18 rotatably mount the wheel hub 20 on the axle 14. A wheel 22 is secured to the hub by mounting stud and nut assemblies 24. The brake disc 26 has a mounting flange 28 which is also secured to the hub 20 by the assemblies 24. Separate securing studs may also be provided circumferentially intermediate the assemblies 24 for separately securing the disc to the hub.

The disc 26 has an axially extending portion 30 connected to the outer periphery of the mounting flange 28 and extending axially inwardly of the wheel and brake assembly. The disc friction surface braking section 32 is attached to and preferably formed integrally with the disc portion 30. This section is formed in an X-configuration as viewed in cross section so that it has a radially inwardly extending groove or recess 34 defined by legs or sides 36 and 38, and a radially outwardly extending groove or recess 40 defined by legs or sides 42 and 44. The legs or sides 36, 38, 42 and 44 are joined by a disc center section 46 to form the X-configuration. It can be seen by this construction that an axially extending groove or recess 48 is also formed by radially adjacent disc sides 36 and 42 and an oppositely extending axially opening groove or recess 50 is also formed by radially adjacent disc sides 38 and 44. Radially extending apertures or passages 52 are provided in circumferentially spaced relation through disc center section 46 for cooling purposes. As the disc rotates, cooling air is circulated through these passages. The disc side 36 has its radially inner end 54 merging with the disc portion 30 throughout its circumference. In the construction illustrated, the axially facing surfaces of the sides provide divergent radially and axially extending friction surfaces. Thus the outer V-groove 40 has friction surface 56 formed on side 42 and friction surface 58 formed on side 44. Similarly the inner V-groove 34 has friction surfaces 60 and 62 respectively formed on the disc sides 36 and 38. In some installations it is preferable to use the side V-groove-defining surfaces as the friction surfaces instead of the radially opposite surfaces. This decreases the axial space required, but increases the required radial clearance for location of the caliper assembly.

The brake caliper 64 has a caliper support 66 which is suitably secured to the steering knuckle 12. Support 66 has a radially extending section 68 through which an aperture 70 is formed. The aperture is axially parallel to the axis of axle 14. This, of course, is the axis of rotation of the disc 26 and the wheel 22. A wheel cylinder support arm may be provided at a part of caliper support 66 if desired, although it is not necessary due to the mounting of the wheel cylinder as will be described. Inner and outer brake apply levers or arms 72 and 74 extend through aperture 70. These levers or arms are preferably constructed with U-shaped center sections 76 and 78 which are respectively received on the pivot edges 80 and 82 forming aperture 70 so that the edges extend within the recesses forming the U-shaped sections. The levers or arms 72 and 74 are, therefore, in position to be pivoted in a plane extending radially from the axis of rotation of the disc 26 and also passing through the axis of the axle 14. The brake apply lever 72 has an inner end 84 on one side of the U-shaped center section 76 which extends radially outward and on which is received the inner brake block or shoe assembly 86. The outer end 88 of lever 72 extends on the other side of the U-shaped center section 76 and has a socket 90 formed therein and receiving the head 92 of the wheel cylinder link pin 94. The outer brake apply lever 74 is similarly constructed so that it has an inner end 96 extending radially inwardly on which is received the outer brake block or shoe assembly 98, and an outer end 100 is provided with a socket 102 receiving the head 104 of the wheel cylinder link pin 106.

The inner brake shoe assembly includes a shoe rim 108 and a lining 110 secured to the rim. They are arcuately shaped as segmental arcs, as is better shown in FIGURE 2. The lining forms a wedge with friction surfaces positioned for selective braking engagement with the friction surfaces 56 and 58 of the disc. The outer brake shoe assembly 98 is formed with a shoe rim 112 and lining 114. It is similarly arcuately formed and the lining is wedge shaped so that it has friction surfaces selectively engageable in braking relation with the friction surfaces 60 and 62 of the disc. The ends of the shoe assemblies have surfaces 116, 118, 120 and 122 which extend in chordal planes relative to the disc. Thus when the linings move radially inwardly and outwardly in their engaging and releasing actions these ends move in chordal planes. Outer guide and brake torque receiving plates 124 and 126 are secured to the caliper support 66 so that their respective surfaces 128 and 130 are respectively engageable with the surfaces 120 and 122 of the outer brake shoe assembly. Similarly, the inner guide and brake torque receiving plates 132 and 134 are secured to the caliper support 66 so that their respective surfaces 136 and 138 are engageable with the end surfaces 116 and 118 of the inner brake shoe assembly. The plates engaging two adjacent ends of the brake shoe assemblies, for example, plates 126 and 134, may be permanently secured to the support 66 by suitable means such as rivets. The other plates 124 and 132 are then secured to the support 66 by removable securing means such as locking bolts. The brake shoe assemblies may, therefore, be removed by removing plates 124 and 132, arcuately moving the brake shoe assemblies until they are no longer engaged by the brake apply levers 72 and 74, and then removing them from the assembly. New brake shoe assemblies are then replaced in the same manner and the guide and brake torque receiving plates 124 and 132 are then again secured in position. The plates 124, 126, 132 and 134 are so positioned that they prevent rotational movement of the brake shoe assemblies during braking action, with the plates on one set of the adjacent ends of the shoes taking the brake torque when the disc is rotating in one direction and the plates on the other set of adjacent ends of the shoes taking the torque when the disc is rotating in the opposite direction. The plates also serve as brake shoe assembly guides as the shoes move inwardly and outwardly during normal operation. All of the guide and brake torque receiving plates may be removably fastened to the caliper support 66 if desired, thereby giving greater flexibility with regard to removal and replacement of the plates as well as the brake shoe assemblies.

The brake actuating means 140 is preferably a hydraulic wheel cylinder assembly. The brake system will operate satisfactorily by the use of a standard size wheel cylinder assembly of the type currently utilized in duo-servo drum brakes for similar sized vehicles as compared to the vehicles on which the brake embodying the invention may be utilized. The wheel cylinder assembly 140 is illustrated as including a body or housing 142 having an inner cylinder wall 144 and receiving opposed pistons 146 and 148 therein. Suitable seals or cups, expansion cups and springs, and wheel cylinder boots may also be provided. The link pins 94 and 106 are engaged by the pistons 146 and 148 so that pressure in the wheel cylinder pressure chamber 150 acting on the pistons to move them apart exerts forces on the ends 88 and 100 of the brake apply levers 72 and 74 in opposite directions, causing the levers to pivot about the pivot edges 80 and 82 and, therefore, move the inner brake shoe assembly 86 radially outward and the outer brake shoe assembly 98 radially inward to frictionally engage the disc. Pressure is supplied to the wheel cylinder through a suitable brake fluid conduit from a pressurizing source such as a commonly utilized master cylinder or brake booster assembly. When the brake pressure is released, the braking force is released on the disc and the brake shoes ride in light engagement with the disc without exerting any noticeable braking force thereon. The wheel cylinder is held in place by maintaining a slight residual pressure therein, holding the link pins in their respective sockets and maintaining the wheel cylinder in a centered position. A wheel cylinder assembly guide or support may also be utilized if desired.

The brake assembly embodying the invention utilizes a groove-and-wedge arrangement with the disc friction surfaces having an X-configuration. The brake linings are constructed in segmental V-block arcs and are guided in chordal planes in their radially inward and outward movements. The disc has a greater total braking surface than a disc of comparable size having parallel radially extending sides such as discs which are currently utilized, and is also provided with cooling apertures interconnecting the vertices of the inner and outer disc recesses or grooves on the sides of which are provided the friction braking surfaces.

What is claimed is:

1. A brake assembly for a vehicle wheel assembly comprising:

a vehicle wheel assembly support member;

a vehicle wheel assembly rotatably mounted on said support member and having a friction braking disc having radially inwardly and radially outwardly facing friction braking surfaces;

a brake caliper support on said support member having an aperture therethrough providing inner and outer brake apply lever pivot edges;

a brake caliper including first inner and second outer brake apply levers extending through said brake caliper support aperture and respectively pivotally engaging said inner and outer pivot edges and having first and second pairs of ends, said first pair of ends being radially aligned with said disc friction braking surfaces;

a radially outwardly facing brake shoe on the first end of the first inner brake apply lever and a radially inwardly facing brake shoe on the first end of the second outer brake apply lever;

and brake apply means mounted on said support member and positioned between the second pair of ends of said brake apply levers and operable to pivot said brake levers on said pivot edges to apply said shoes to said disc friction braking surfaces.

2. The brake assembly of claim 1, said brake caliper support having brake shoe guide and brake torque receiving members mounted thereon at opposite ends of said brake shoes in brake shoe end abutting relation, at least one of said brake shoe guide and brake torque receiving members associated with each of said shoes being removable to permit said shoes to be removed and replaced.

3. The brake assembly of claim 2, said brake shoe guide and brake torque receiving members having surfaces thereon adjacent said shoes extending in chordal planes in parallel to movement of said shoes.

4. A disc brake assembly comprising:

a support member, a disc rotatably mounted on said support member and having radially inwardly and radially outwardly facing braking surfaces, and a brake caliper assembly including a pair of levers having brake shoes on one set of adjacent ends thereof in braking alignment with said disc braking surfaces and brake apply means on the other set of adjacent ends thereof, said support member having first and second pivot edges in substantial axial alignment with said radially inwardly and radially outwardly facing disc braking surfaces, each of said levers having a generally U-shaped center section receiving one of said pivot edges in the U-shaped section thereof and oppositely extending arm sections, one arm section of which is a part of said other set of adjacent ends and is connected with said brake apply means and the other arm section of which has the outer end extending toward one of said braking surfaces and has one of said brake shoes mounted thereon.

5. The disc brake assembly of claim 4,
said brake apply means being a hydraulic wheel cylinder assembly having a cylinder body mounted on said support member and opposed movable pistons operatively connected with said levers.

6. The disc brake assembly of claim 4,
said disc braking surfaces being formed as divergent sides of a pair of annular V-grooves with one of said V-grooves opening radially inwardly and the other of said grooves opening radially outwardly.

7. The disc brake assembly of claim 6,
said disc having a plurality of radially extending cooling passages extending therethrough interconnecting the vertices of said V-grooves.

8. A groove-and-wedge disc brake assembly comprising:
a rotatable disc to be braked having opposed grooves providing friction braking surfaces;
a brake caliper having a scissors-like brake apply unit including wedge-like opposed shoes arranged to engage the friction braking surfaces of said disc formed by said opposed grooves;
and brake force apply means acting on said caliper for forcibly engaging said shoes with said disc friction braking surfaces, said disc having a plurality of circumferentially spaced apertures extending therethrough and connecting said opposed grooves, said disc friction braking surfaces forming, in a radial cross section, an X-configuration, said friction braking surfaces being radially inwardly and outwardly divergent facing surfaces defining said grooves as radially spaced grooves.

References Cited by the Examiner

UNITED STATES PATENTS

| | | | |
|---|---|---|---|
| 707,345 | 8/1902 | Neale | 188—73 |
| 2,903,099 | 9/1959 | Nelson | 188—264 X |
| 3,237,732 | 3/1966 | Hayes | 188—218 |

FOREIGN PATENTS

| | | |
|---|---|---|
| 1,123,817 | 6/1956 | France. |
| 1,237,699 | 6/1960 | France. |
| 1,282,469 | 12/1961 | France. |

MILTON BUCHLER, *Primary Examiner.*

B. S. MOWRY, *Assistant Examiner.*